(12) United States Patent
Zelinger

(10) Patent No.: US 6,216,640 B1
(45) Date of Patent: Apr. 17, 2001

(54) PET TOY

(75) Inventor: Alan Zelinger, Newark, NJ (US)

(73) Assignee: Ethical Products, Inc., Newark, NJ (US)

( * ) Notice: Subject to any disclaimer, the term of this patent is extended or adjusted under 35 U.S.C. 154(b) by 0 days.

(21) Appl. No.: 09/169,629

(22) Filed: Oct. 9, 1998

(51) Int. Cl.[7] .................................................. A01K 29/00
(52) U.S. Cl. ...................................................... 119/707
(58) Field of Search .................................. 119/702, 707, 119/709, 710, 711, 712; 446/125, 102, 383; 273/428, 146, 425, 426, 424

(56) References Cited

U.S. PATENT DOCUMENTS

| | | | |
|---|---|---|---|
| 4,309,038 | * | 1/1982 | Spoon ................................. 273/428 |
| 4,993,712 | * | 2/1991 | Urwin ................................. 273/73 R |
| 5,769,681 | * | 6/1998 | Greenwood, Sr. et al. ......... 446/120 |
| 5,857,431 | * | 1/1999 | Peterson ............................... 119/710 |
| 5,897,417 | * | 4/1999 | Grey .................................... 446/125 |

* cited by examiner

Primary Examiner—Thomas Price
(74) Attorney, Agent, or Firm—Helfgott & Karas, PC

(57) ABSTRACT

A bone-shaped plastic toy is molded with a tubular central portion and a partial spherical socket on each end of the central portion. The sockets are formed by spring fingers which deflect outwardly to receive and hold a replaceable play ball. Pets, such as dogs, particularly enjoy chewing on balls and can alternately chew on one ball, then the other. A scent can be applied to the toy to enhance its desirability and pet interest. If a ball becomes worn, it can be easily replaced. Pets can play with the entire toy, with the balls removed from the toy or with the toy without the balls, thereby offering a variety of play options for the pet and pet owner.

19 Claims, 2 Drawing Sheets

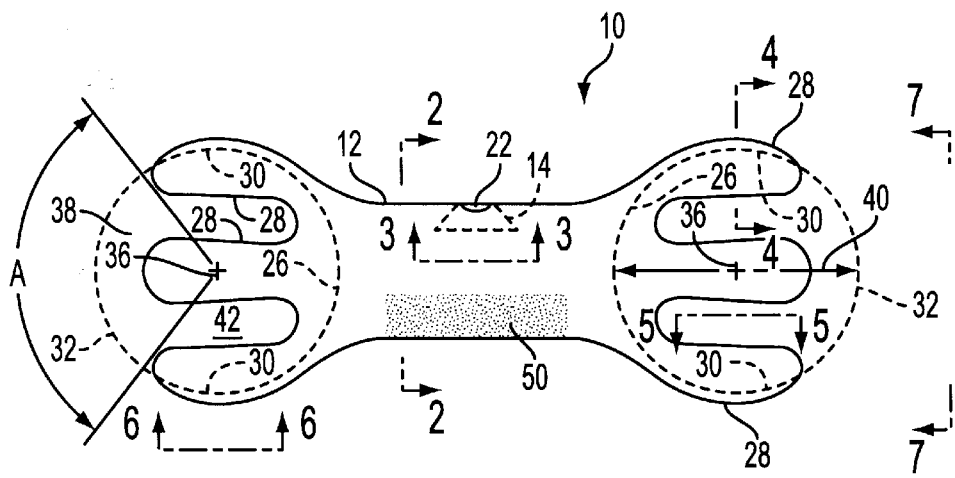
FIG. 1
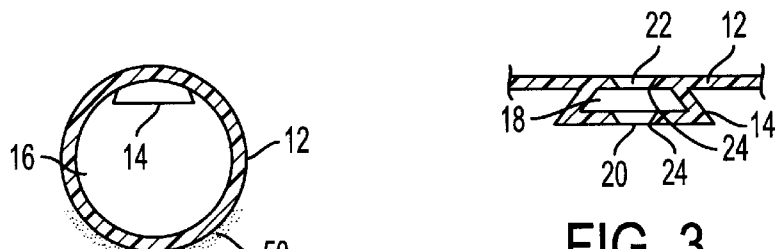
FIG. 2
FIG. 3
FIG. 4
FIG. 5
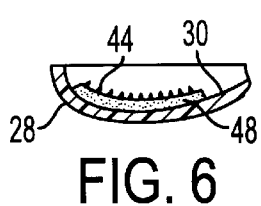
FIG. 6
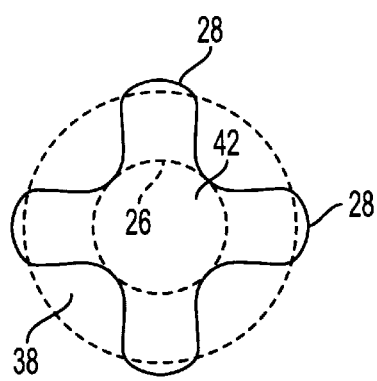
FIG. 7

PET TOY

BACKGROUND OF THE INVENTION

1. Field of the Invention

The present invention relates in general to chewable pet toys and in particular to a dog toy having a pair of ball sockets for gripping and holding a pair of elastic balls.

2. Description of Prior Developments

Pet toys are available in many shapes and sizes for entertaining and amusing many different types of animals. Toys intended for use by dogs are often formed of a relatively tough chewable material such as leather or hard rubber. Although these conventional toys are enjoyed by most dogs, after a period of time, these toys are often ignored as a dog loses interest.

Accordingly, a need exists for a pet toy which keeps the interest of a pet and is used over and over.

A further need exists for a pet toy which provides a chewable resilient surface particularly adapted for dogs.

Another need exists for a chewable dog toy which incorporates commercially available balls having a resistance and flexibility that dogs enjoy gripping and biting.

A further need exists for a pet toy which can be used with or without one or more play balls.

Still a further need exists for a dog toy which allows for the removal of one or more detachable balls so as to allow a pet to play with the balls alone, to play with the toy without the ball(s) or to play with the combination of the toy and the ball(s).

SUMMARY OF THE INVENTION

The present invention has been developed to fulfill the needs noted above and therefore has as an object the provision of a dog toy which provides one or more chewable portions having a resilient elasticity particularly adapted for biting and chewing by a dog.

A further object of the invention is the provision of a dog toy having gripping portions which resiliently and removably grip and hold a pair of play balls.

Another object of the invention is the provision of a dog toy which can be scented for increasing a pet's interest and enjoyment.

Still another object of the invention is the provision of a dog toy that generates a sound, such as a squeak, when it is chewed.

Yet another object of the invention is the provision of a bone-shaped elastic toy having a resilient hemispherical socket forced at opposite end portions for receiving and holding play balls such as tennis balls, with the aid of a set of gripping fingers extending around each socket.

Still another object of the invention is the provision of a pet toy which includes one or more removable balls which allows a pet to play with the ball or balls alone, with the toy with the balls removed or with the combined toy and ball(s) assembly.

These and other objects are met by the present invention which is directed to a chewable, bone-shaped dog toy having a pair of resilient sockets for receiving, gripping and holding a pair of toy balls such as tennis balls. The sockets may include a set of spring fingers having high-friction roughened gripping surfaces for positively gripping the surface of the play balls.

The surface of the toy may be flocked or partially wrapped with a sleeve of fibrous material for enhancing the texture and feel of the toy as a dog bites and chews the toy. A scent can be added to the flocking or fibrous textured material to further increase a pet's interest and satisfaction. The flocked material as well as the fibrous surface of the tennis balls absorbs a dog's saliva and tends to attract the dog to play again and again.

The balls may be snapped into and out of the sockets in the toy to allow a pet to play with the balls by themselves, or to play with the toy with one or two balls snapped in the sockets or to play with the toy with both balls removed. When both balls are removed, dogs enjoy biting, chewing and rubbing on the empty resilient fingers which normally hold the balls in their sockets.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 1 is a front elevation view of a pet toy constructed in accordance with the invention and showing a pair of balls in dashed lines;

FIG. 2 is a view in section taken through line 2—2 of FIG. 1;

FIG. 3 is a view in section taken through line 3—3 of FIG. 1;

FIG. 4 is a view in section taken through line 4—4 of FIG. 1;

FIG. 5 is a top plan view in fragment of a gripping finger of FIG. 1, as seen from line 5—5 thereof;

FIG. 6 is a view in section taken through line 6—6 of FIG. 1;

FIG. 7 is a right end view of FIG. 1 as seen from line 7—7 thereof;

In the various figures of the drawings, like reference characters designate like parts.

DETAILED DESCRIPTION OF THE PREFERRED EMBODIMENTS

Figure 8:
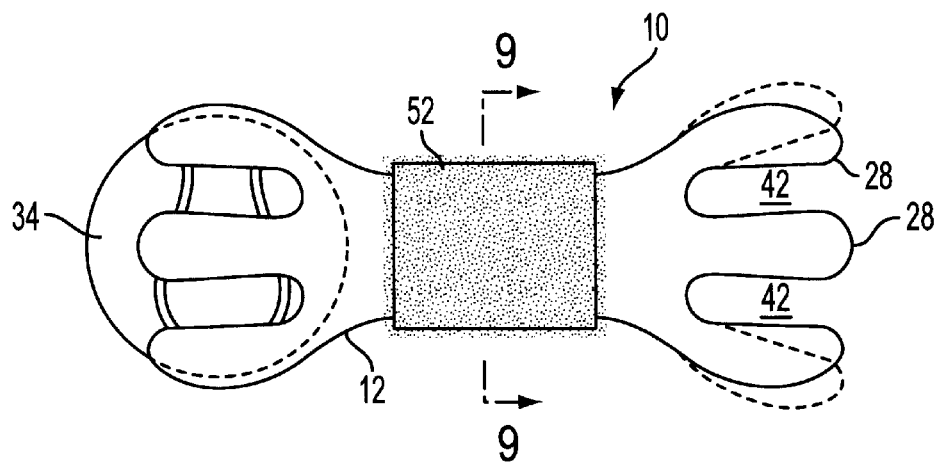
FIG. 8 is a front elevation view of an alternate embodiment of the invention showing the resilient deflection of the gripping fingers in dashed lines.

The present invention will now be described in conjunction with the drawings, beginning with FIG. 1 which shows a pet toy 10 particularly adapted for chewing and biting by a pet such as a dog. The toy 10 is preferably molded from a resilient plastic or rubber material with a durometer and toughness sufficient to withstand prolonged use and abuse including chewing and biting. A vinyl plastic material has been found satisfactory for this application.

Toy 10 includes a central hollow tubular portion 12. As seen in FIGS. 2 and 3, a noisemaker, such as a whistle or "squeaker" 14 can be molded or mounted inside the cylindrical cavity 16 of the tubular portion 12. In this example, the squeaker 14 is molded homogeneously with the tubular portion 12. The squeaker includes an annular funnel-shaped or truncated cone-shaped chamber 18 having a pair of axially aligned funnel-shaped openings 20, 22 with sharp edges 24. When a pet bites on and squeezes the resilient tubular portion 12, air expelled from chamber 16 produces a squeak. When the bite is released, the air reentering chamber 16 produces another squeak. It is of course possible to mold the central tubular portion 12 as a solid member, in which case the chamber 16 and the squeaker 14 would be omitted.

Each opposed free end of the tubular portion 12 includes a generally spherical surface end portion 26 (FIGS. 1 and 7). A plurality of gripping fingers 28 extends axially and radially outwardly from each end portion 26. As seen in FIGS. 1, 4 and 6, the inner or gripping surface 30 of each finger 28 is somewhat arcuate, curved or spoon shaped. As best seen in FIG. 1, the gripping surfaces 30 are substantially aligned with one another over the surface of an imaginary sphere 32, which, as seen in FIG. 8 may take the form of a rubber ball such as a tennis ball 34 or the like.

Each gripping surface 30 extends continuously in a circular arc from each end surface portion 26 about a common center point 36 (FIG. 1). The arc enclosed by surface portion 26 and gripping surfaces 30 is advantageously greater than 180° so as to encircle and grab each ball 34 over more than half of its circumference and surface area as shown in FIG. 1. In this case, the opening or mouth 38 defined between the free ends of the griping fingers 28 extends over an arc A, centered on center point 36, of less than 180°.

By limiting opening 38 to less than 180°, the fingers 28 must be resiliently deflected radially outwardly from their center point 36 when a ball having a diameter matching or slightly greater than (or slightly smaller than) that of sphere 32 is pushed into and through mouth 38. This deflection is shown in dashed lines in FIG. 8. In practice the diameter 40 (FIG. 1) of the sphere 32 is set at about 2 inches to adapt toy 10 for use with one or more tennis balls 34.

Once inserted and snapped into the substantially hemispherical pocket 42 (FIG. 1) defined by end portion 26 and fingers 28, tennis ball 34 is securely held to toy 10 so that it can only be removed with significant effort. In this manner, a dog or other pet cannot easily remove the tennis balls from their mounting pockets or sockets 42. A length of about 8 to 12 inches between the exposed ends of balls 34 has been found acceptable, with a length of about 9 to 10 inches being preferred.

Additional retention and griping force can be applied to ball 34 by forming a high friction roughened or gripping surface portion 44 on one or more finger gripping surfaces 30. As seen in FIGS. 4 and 5, small teeth 46 can be molded homogeneously on gripping surfaces 30. The teeth 46 can be formed as conical sharp-tipped projections. Alternatively, a strip of hooked fastener material 48 (FIG. 6) such as available under the brand Velcro can be adhesively bonded to surface 30 to hook into the flocked surface of tennis ball 34.

Although a scent can be directly molded into the plastic or elastic material of toy 10, a liquid or other scent can be inserted through openings 22, 20 of the noisemaker 14 to coat the interior cylindrical walls of chamber 16.

Figure 9:
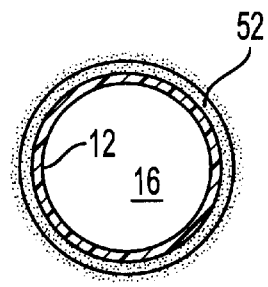
FIG. 9 is a view in section taken through line 9—9 of FIG. 8.

A scent can provide increased interest in toy 10 and provide a pet with increased chewing enjoyment. Enjoyment can also be increased by providing a fibrous chewing surface on toy 10 such as flocked surface portion 50 shown in FIGS. 1 and 2. This flocked surface 50 can be formed during molding so as to cover some or all of the central tubular portion 12. Alternatively, as shows in FIGS. 8 and 9, a fibrous sleeve 52 formed of a felt-like or other fabric material can be adhesively bonded around the tubular portion 12.

It should be noted that scent can be applied to the flocked surface 50 as well as to sleeve 52 and supplemented from time to time as needed.

By allowing the balls 34 to be removed from the tubular portion 12, a pet and pet owner can play with the ball or balls 34 by themselves in a game of "fetch" or to use the toy 10 with one or both balls attached. It has been found that dogs also enjoy playing with the toy itself with one or both balls removed. Dogs seem to enjoy biting and chewing the flexible fingers 28 when a ball 34 is removed from between fingers 28.

Figure 10:
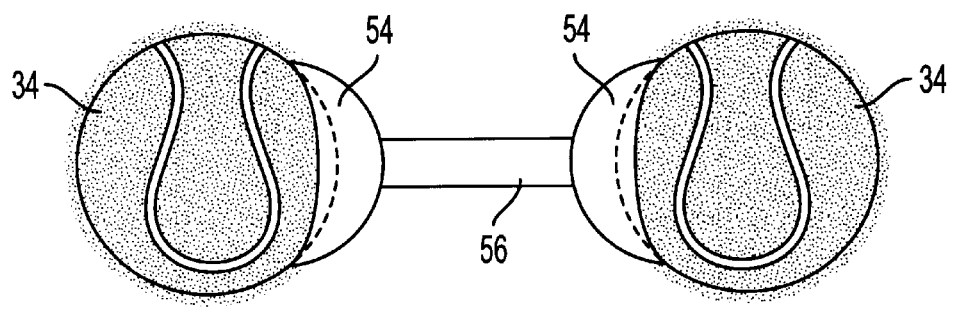
FIG. 10 is a front elevation view of a pet toy constructed in accordance with a commercially available product.

This versatile 3-in-1 construction should be compared with the toy shown in FIG. 10 wherein balls 34 are permanently adhesively affixed to plastic cups 54 which are formed on the opposite ends of plastic stem 56. This fixed construction does not allow a pet to play with the balls without playing with the entire toy including the cups and stem.

There has been disclosed heretofore the best embodiment of the invention presently contemplated. However, it is to be understood that the various changes and modifications may be made thereto without departing from the spirit of the invention.

What is claimed is:

1. A pet toy, comprising:
   an elongated central portion having a pair of opposed end portions; and
   a pair of resilient pockets formed respectively on said pair of opposed end portions for holding a pair of toy balls on said pet toy,
   wherein said central portion comprises a hollow tubular portion.

2. The pet toy of claim 1, wherein said central portion comprises a fibrous portion.

3. The pet toy of claim 2, wherein said fibrous portion comprises a sleeve encircling said central portion.

4. The pet toy of claim 2, further comprising a scented material applied to said fibrous portion.

5. The pet toy of claim 1, wherein each one of said pair of resilient pockets comprises a plurality of resilient gripping fingers.

6. The pet toy of claim 5, wherein said gripping fingers comprise arcuate gripping surfaces.

7. The pet toy of claim 6 wherein said arcuate gripping surfaces are aligned over a substantially spherical surface.

8. The pet toy of claim 7, wherein said opposed end portions define arcuate surface portions aligned over said substantiallit spherical surface.

9. The pet toy of claim 8, wherein said arcuate gripping portions and said arcuate surface portions are aligned on a common center point.

10. The pet toy of claim 5, wherein said gripping fingers comprise high friction gripping portions.

11. The pet toy of claim 10, wherein said gripping portions comprise molded teeth.

12. The pet toy of claim 1, wherein said resilient rockets define hemispherical pocket portions and open mouth portions opening into said hemispherical pocket portions.

13. The pet toy of claim 12, further comprising at least one resilient toy ball resiliently gripped within one of said resilient pockets.

14. The pet toy of claim 13, wherein said toy ball comprises a tennis ball.

15. The pet toy of claim 1 wherein said central portion and said pockets are homogeneously molded from a vinyl plastic material.

16. A pet toy, comprising:

elongated central portion having a pair of opposed end portions;

a pair of resilient pockets formed respectively on said pair of opposed end portions for holding a pair of toy balls on said pet toy, and a scented material molded into said central portion.

17. A pet toy, comprising:

elongated central portion having a pair of opposed end portions;

a pair of resilient pockets formed respectively on said pair of opposed end portions for holding a pair of toy balls on said pet toy, and a noisemaker disposed within said central portion.

18. The pet toy of claim 17, wherein said noisemaker has a hole formed therein and further comprising a scented material provided within said central portion via said central portion via said hole formed in said noisemaker.

19. A pet toy, comprising:

an elongated central portion having a pair of opposed end portions, and a pair of resilient pockets formed respectively on said pair of opposed end portions for holding a pair of toy balls on said pet toy, wherein each of said pair of resilient pockets comprises a plurality of resilient gripping fingers, and wherein said gripping fingers comprise high friction, gripping portions, and wherein said griping portions comprise a hooked material.

* * * * *